Sept. 22, 1970
F. H. BACHOFEN
3,530,304
DRIVING CIRCUIT FOR IMPULSE COILS WITH CAPACITOR
SHORTING SWITCH
Filed Aug. 21, 1968
3 Sheets-Sheet 1
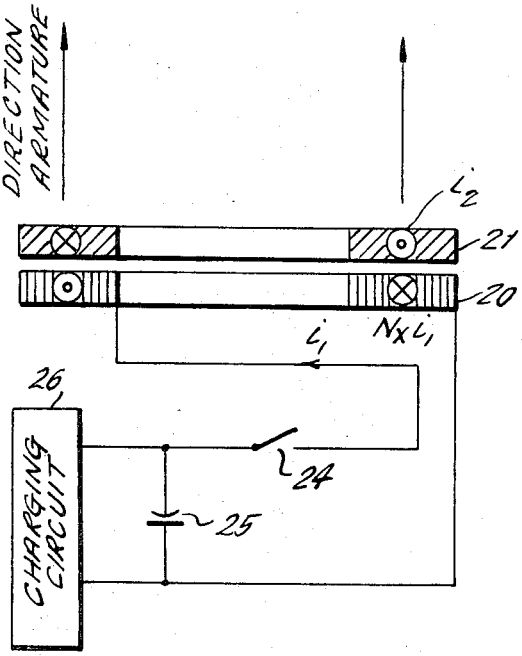
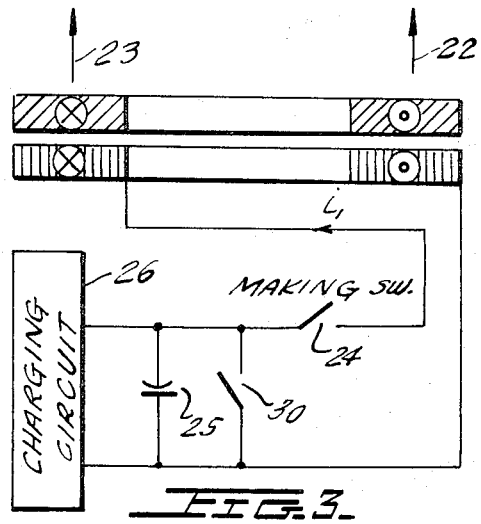
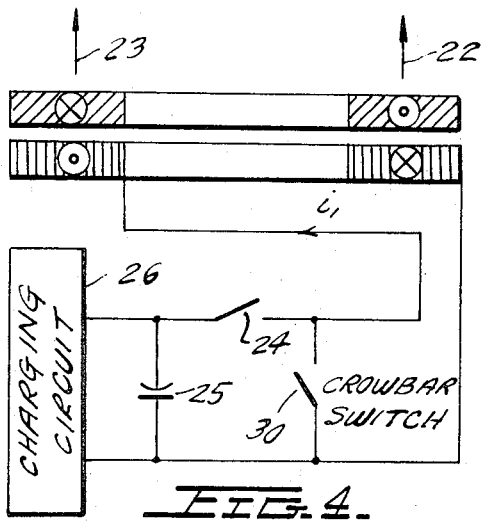
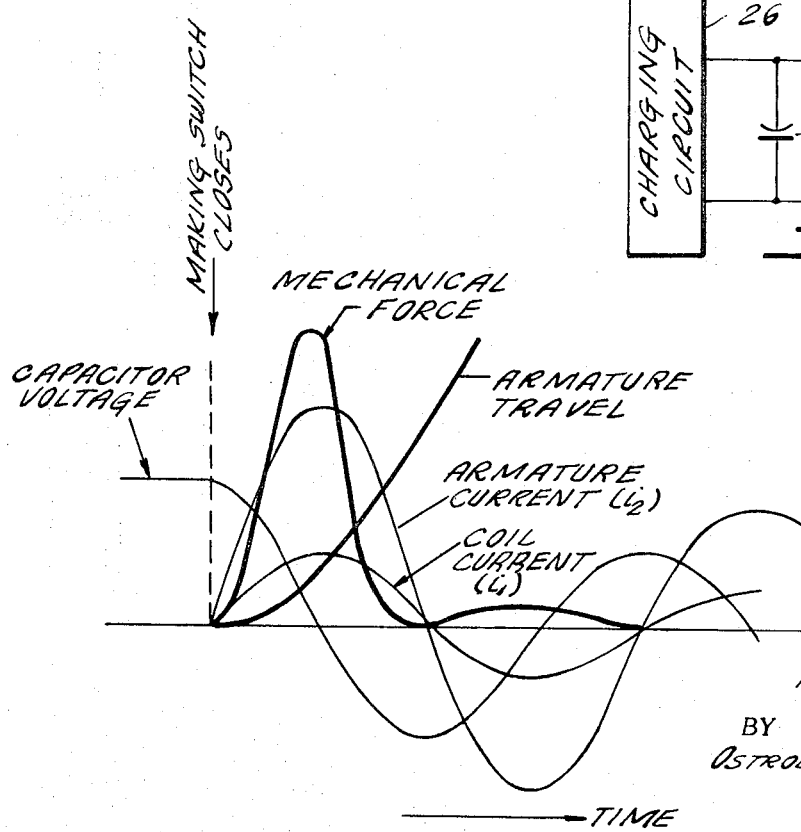
INVENTOR.
FELIX H. BACHOFEN
BY
OSTROLENK, FABER, GERB & SOFFEN
ATTORNEYS

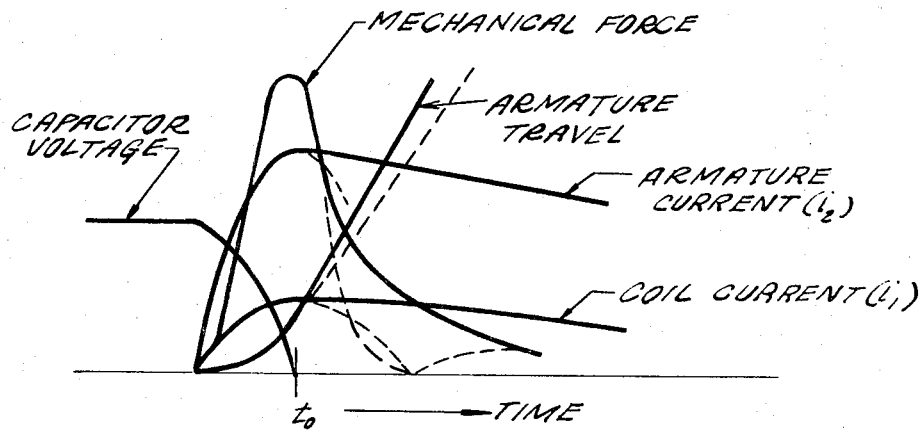
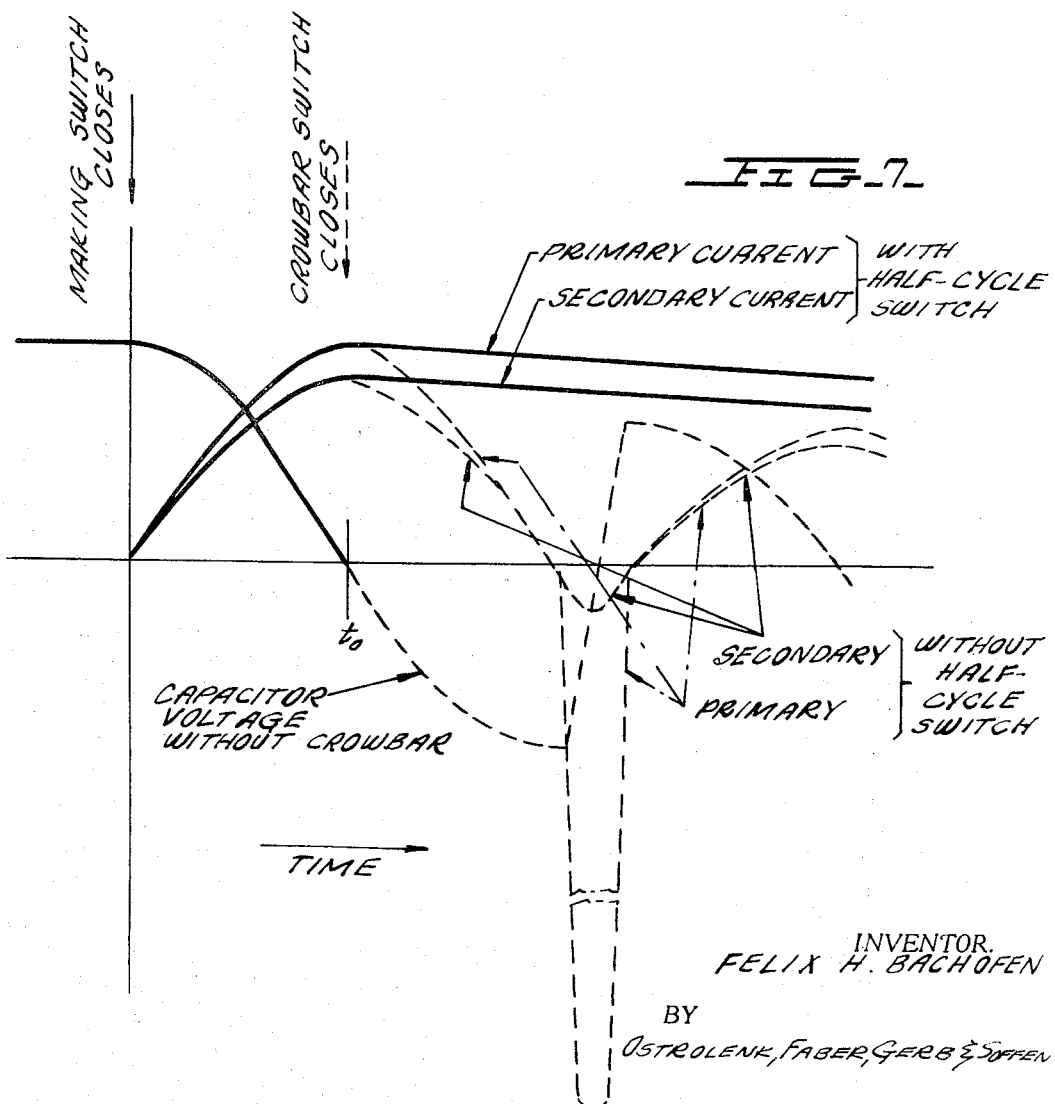

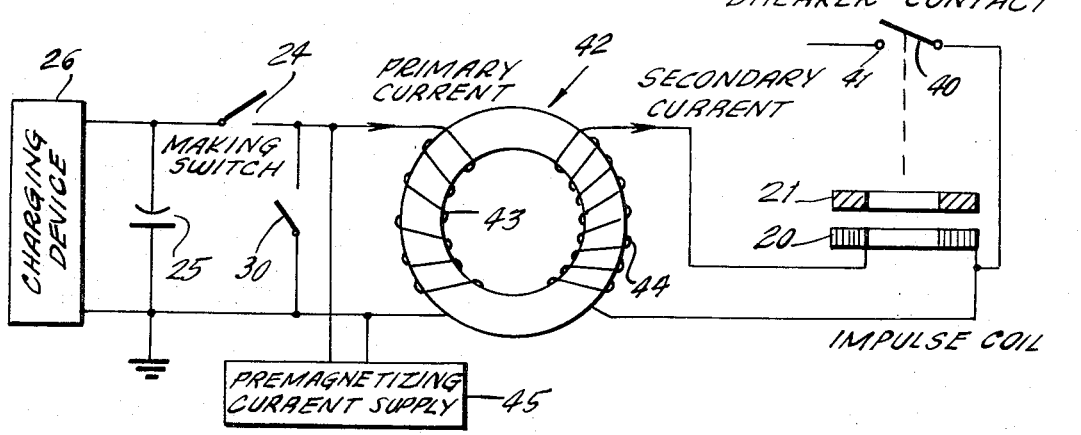
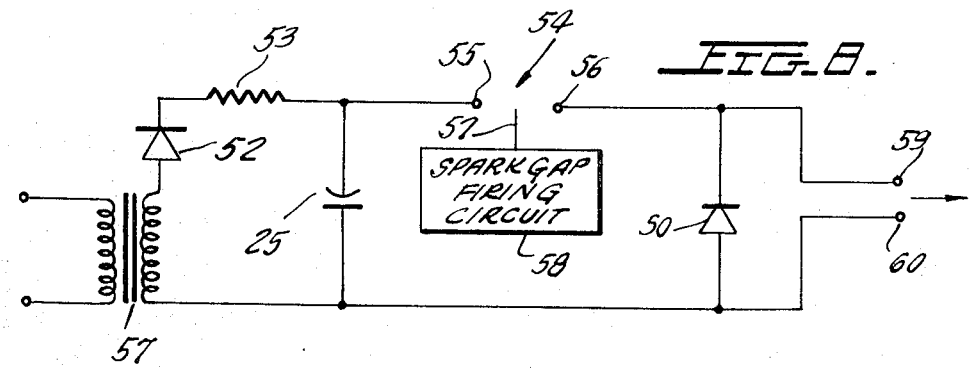
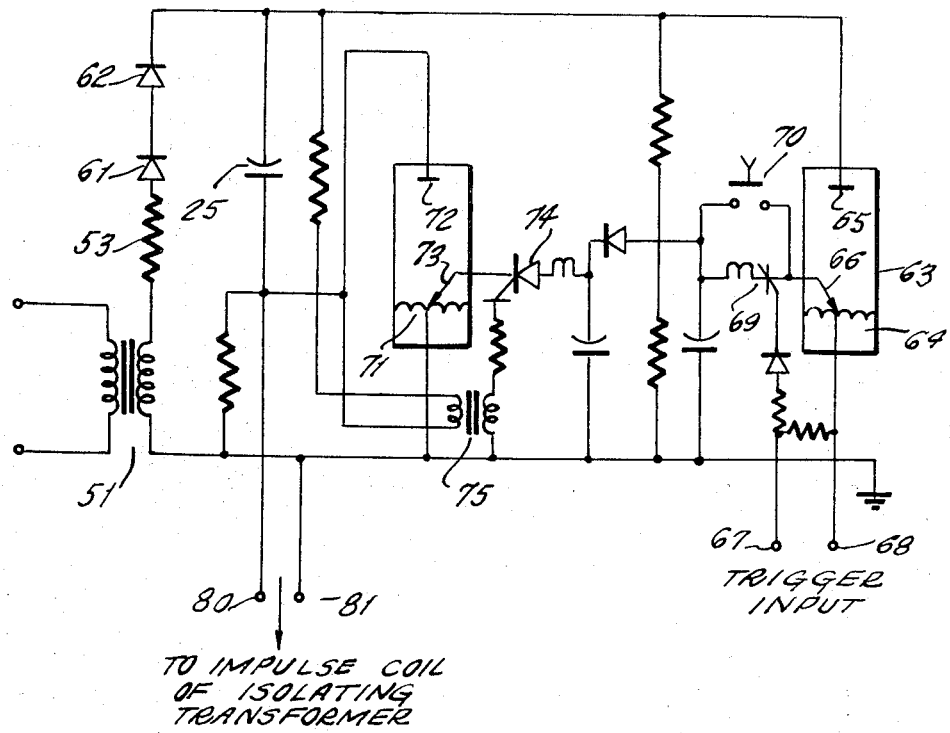

_United States Patent Office_

3,530,304
Patented Sept. 22, 1970

3,530,304
DRIVING CIRCUIT FOR IMPULSE COILS WITH CAPACITOR SHORTING SWITCH
Felix H. Bachofen, Folcroft, Pa., assignor to I-T-E Imperial Corporation, Philadelphia, Pa., a corporation of Delaware
Filed Aug. 21, 1968, Ser. No. 754,334
Int. Cl. H01f 7/18
U.S. Cl. 307—108                                 5 Claims

ABSTRACT OF THE DISCLOSURE

An impulse coil system has a primary winding and a short-circuited secondary winding closely coupled to the primary winding and movable away from the primary winding. The primary winding is energized from a charged capacitor through a making switch. A high speed shorting switch, such as a diode, controlled rectifier, a suitable spark gap arrangement or a suitable mechanically driven pair of contacts are connected across the capacitor and short-circuit the capacitor when the capacitor voltage attempts to reverse.

---

This invention relates to impulse coil devices, and more particularly relates to an improved circuit for driving the primary winding of an impulse coil which reduces the duty on the energy storage capacitor and increases the accelerating force applied to the movable winding of the system without increasing the input power required for the system.

The use of impulse coils for providing high speed movement of various types of mechanisms is well known. The use of such impulse coils are typically shown in U.S. Pats. 3,128,361 to Kesselring and 3,302,144 to Jensen. Typically, these devices consist of a fixed primary winding and a short-circuited conducting ring which is coaxial with the primary winding and acts as a short-circuited secondary winding. A charged capacitor is connected in series with the primary winding through a suitable switching device so that when the switching device is closed, the capacitor discharges through the primary winding. The primary winding and short-circuited ring are magnetically coupled to one another so that a current is induced into the short-circuited ring, giving rise to magnetic forces of repulsion between the primary winding and short-circuited winding and thus a strong accelerating force is applied to the ring which moves it away from the primary winding. The short-circuited ring may then be mechaically coupled to any mechanism which is to be operated through the energy of movement of the ring.

In this type of arrangement, the acceleration applied to the ring can be several thousand times the acceleration due to gravity. Most of this force is developed during the first half cycle of the discharge current. As the discharge current decreases toward zero, the force similarly decreases. Moreover, since the capacitor current reverses, a negative voltage will appear across the capacitor during the negative half cycle of the discharge oscillation. This increases the voltage which the capacitor must withstand even though the capacitor is not useful for driving the short-circuited ring after the first current loop.

In accordance with the present invention, a high speed switching device, such as a diode, is connected across the primary winding with its direction of reverse voltage blocking such that the diode prevents current flow therethrough from the charged capacitor when the capacitor is in its energy-storing state. When the capacitor discharges, however, and its voltage reverses, the diode provides a short-circuit for both capacitor and primary winding. Therefore, current flow can continue through the primary winding in the direction originally established during the first half loop current while the short-circuit on the capacitor prevents a reversal of capacitor voltage. As a result, the voltage duty applied to the capacitor is decreased while relatively high current can continue to flow through the primary winding to continue to apply an accelerating force to the short-circuited ring for a longer period of time than was previously possible, since the winding current does not decrease to zero as rapidly as in the past. Therefore, the addition of a diode or some equivalent high speed switching means which short-circuits the capacitor when its voltage during reverses acts to increase the accelerating force which can be applied to a short-circuited winding and decreases the voltage duty applied to the charged capacitor.

Accordingly, the primary object of this invention is to improve the efficiency of an impulse coil system.

Another object of this invention is to reduce the voltage duty on a capacitor of an impulse coil system.

A further object of this invention is to increase the force applied to the movable coil of an impulse system.

These and other objects of this invention will become apparent from the following description taken in connection with the drawings in which:

FIG. 1 schematically shows the well known prior art of impulse coil systems;

FIG. 2 graphically shows various parameters of the arrangement of FIG. 1 as a function of time;

FIG. 3 illustrates the present invention in which the high speed switching means is schematically illustrated by a pair of contacts connected directly across the discharge capacitor;

FIG. 4 is similar to FIG. 3 and illustrates the novel high speed switch device connected directly across the primary winding of the system;

FIG. 5 is similar to FIG. 3 and illustrates the parameters of the system in comparison to the parameters of FIG. 2;

FIG. 6 schematically illustrates the application of the invention to an impulse drive system which includes a transformer interposed between the capacitor and primary impulse coil winding;

FIG. 7 graphically illustrates the parameters of the circuit of FIG. 6 as a function of time;

FIG. 8 illustrates the circuit of the present invention in which the novel high speed switch is a diode;

FIG. 9 illustrates a circuit in which the novel high speed switch is an ignitron.

Referring first to FIG. 1, there is illustrated in schematic fashion a standard impulse coil system which includes a multi-turn primary winding 20 which is fixed to a suitable support and which is closely coupled to a short-circuited ring 21 which is movable in the direction of arrows 22 and 23. Obviously, a suitable mechanism to be operated by the impulse coil system will be connected to movable winding 21 which serves as a secondary winding to winding 20. Winding 20, which is shown as consisting of a spiral winding, formed of a flat conductor, is connected in series with a suitable making switch 24 and in series with a suitable energy storage capacitor 25. A charging circuit 26 is then connected to charge energy storage capacitor 25 to a given voltage. When switch 24 is closed, the capacitor 25 discharges through switch 24 and into winding 20 with a discharge current $i_1$ (FIG. 2). A current $i_2$ is then induced in the closely coupled short-circuited ring 21, thereby giving rise to a force of repulsion between windings 20 and 21 in the direction of arrows 22 and 23, as shown in FIG. 2 by the label "Mechanical Force." The armature travel is also indicated in FIG. 2 as a function of time due to the mechanical force applied to the movable ring 21.

The discharge of capacitor 25 is an oscillatory discharge, as shown in FIG. 2, with the capacitor voltage reversing, shown in FIG. 2 as leading the discharge current $i_1$, in the usual manner. It will also be observed from FIG. 2 that toward the end of the first half cycle of current $i_1$, the mechanical force on the winding 21 is negligible. Moreover, since the capacitor voltage reverses, capacitor 25 must be designed to a higher voltage rating than would normally be required from its D-C charged value.

In accordance with the present invention and as illustrated in FIG. 3, where components similar to those in FIG. 2 carry similar identifying numerals, a high speed switching means 30 is added to the circuit and is in parallel with capacitor 25. FIG. 4 illustrates that the half cycle switching means 30 could also be connected in parallel with winding 20, it being noted that in both FIGS. 3 and 4, the switch would be connected in parallel with both components 20 and 25 when switch 24 is closed.

High speed switching device 30 can take several forms and could, for example, be a diode, controlled rectifier, ignitron, or suitable spark device. Other similar devices could be used.

The switching device 30 operates in such a manner that it is closed when the capacitor voltage reverses. This operation is obtained inherently by making device 30 a diode or by automatically firing a suitable controlled rectifier at an appropriate time within the first half loop, or can be obtained by suitably closing mechanical contacts in the first half loop. The switching device becomes conductive when the voltage of the capacitor passes through zero at time $t_0$ in FIG. 5 where it is seen that coil current $i_1$ will not reverse as in the case of FIG. 2, but continues to flow so that the armature current $i_2$ which is the current in short-circuited ring 21 also continues to flow at a relatively high value. This then modifies the force on ring 21 from the dotted line value shown in FIG. 5 corresponding to the force shown in FIG. 2 with the force trailing off much more slowly, as shown in solid lines. As a result, the armature travel curve is modified, as shown in FIG. 5, to a sharper slope so that increased acceleration is obtained for the short-circuited ring 21. Note that this improved operation is obtained without the expense of additional input energy for the system. Moreover, the capacitor voltage does not reverse as in the case of FIG. 5 so that the duty of the capacitor is reduced, thereby making it possible to use a smaller capacitor than heretofore possible for a given circuit arrangement.

The use of the novel high speed switching device 30 has further beneficial results where a transformer is connected between the discharge capacitor and impulse coil arrangement. FIG. 6 illustrates this type of arrangement where components similar to those of FIGS. 1, 3 and 4 are given similar identifying numerals. FIG. 6 further schematically illustrates the mechanical connection of short-circuited ring 21 to a movable contact 40 which is moved to a disengaged position with relation to fixed contact 41 when the impulse coil system is operated. This type arrangement may be used where contacts 40 and 41 are the contacts of a synchronous circuit breaker system.

In the system of FIG. 6, a transformer 42 having a primary winding 43 and a secondary winding 44 having more turns than primary winding 43 is interposed between capacitor 25 and winding 21. The high speed switching means 30 is then connected across primary winding 43. In systems of the type shown in FIG. 6, it is necessary that the leakage inductance of the transformer 42 be small compared to the inductance of winding 20 so that there will be an efficient transmission of energy from capacitor 25 to winding 20. This type transformer is normally constructed with a relatively large cross-sectional area core with a relatively small number of turns for the primary and secondary windings 43 and 44. The cross-sectional area of the iron core in such a transformer may also be reduced in half and the leakage inductance reduced by about 30% by applying a D-C bias from a suitable biasing source 44 which is connected to primary winding 43. Obviously, this bias could be applied to a third winding on the transformer core. The bias is applied in such a manner that the core will be saturated at the beginning of the discharge of capacitor 25 when switch 24 is closed. As the discharge current flows through winding 43, the flux of the core reverses so that a voltage is induced in winding 44.

In this type of arrangement, only "positive" half cycle current loops will drive the transformer. The negative half cycle loops, however, are in the direction of saturation of the transformer so that this current would normally reach a very high peak value in primary winding 43. The primary and secondary currents are indicated in dotted lines in FIG. 7, with the primary current peak being sufficiently high so that it may be dangerous to the capacitor and other elements of the circuit which carry this current. In accordance with the invention, the high speed switch means 30 is closed at time $t_0$ in FIG. 7 so that high current peaks cannot occur and voltage reversal of capacitor 25 is prevented.

FIG. 8 illustrates a typical charging circuit in connection with a diode 50 used for the high speed switching means 30 of the previous figures. The charging circuit may use a suitable A-C source such as transformer 51, the secondary winding of which is connected in series with rectifier 52, current limiting resistor 53 and the charging capacitor 25. The making switch 24 of the prior figures is shown in FIG. 8 as consisting of a spark gap switch 54 having main electrodes 55 and 56 and an auxiliary firing electrode 57 suitably connected to any desired type of firing circuit 58. Diode 50 will operate as described previously such that, after firing the spark gap 54, and when voltage of capacitor 25 reaches zero, diode 50 will establish a conductive path in a direction which prevents the voltage from reversing on capacitor 25. Diode 50 also provides a current path for the flow of current to components connected to terminals 59 and 60 such as winding 20 in FIGS. 3 or 4 or winding 43 in FIG. 6.

The diode 50 may be used as the high speed switching device for impulse coil systems with moderate error ratings. Obviously, diode 50 provides an extremely simple arrangement which does not require expensive control equipment, or the like. Where the application, however, requires higher charging voltages and higher discharge currents than a single diode can tolerate, it is possible to provide various series parallel arrangements of such diodes.

Alternatively, an ignitron-type device could be used, as schematically illustrated in FIG. 9 by ignitron 60. Referring to FIG. 9, the components therein which are identical to FIG. 8 are given identical numerals. Thus, the charging circuit consists of an A-C transformer 51 which is connected to energy storage capacitor 25 through resistor 53 and, in the case of FIG. 9, series connected diodes 61 and 62 which can accommodate higher voltages of the A-C supply circuit. The making switch 54 of FIG. 8 is replaced in FIG. 9 by ignitron 63 which consists of a mercury pool cathode 64, an anode 65 and an igniter electrode 66. A trigger circuit is provided for igniter 66 which is connected to a suitable trigger input source connected to terminals 67 and 68 whereby controlled rectifier 69 is fired when control switch 70 is closed in order to apply a current pulse to igniter 66 to fire the ignitron 63. The high speed ignitron switching device 60 similarly consists of a mercury pool 71, anode 72 and an igniter electrode 73. A controlled rectifier 74 is connected in series with igniter 73 and is fired from transformer 75 when the voltage of capacitor 25, which is normally charged positive at the top thereof, reverses. Note that impulse coil or isolating transformer of the previous figures is connected to terminals 80 and 81 which correspond to terminals 59 and 60 of FIG. 8.

Although this invention has been described with respect to particular embodiments, it should be understood that many variations and modifications will now be obvious to those skilled in the art.

The embodiments of the invention in which an exclusive privilege or property is claimed are defined as follows:

1. An impulse coil system comprising a first winding, a second winding which is short circuited and coupled to said first winding and movable away from said first winding, an energy storage capacitor, means for charging said capacitor to a given potential, circuit means including a switch means connecting said capacitor and first winding in series with one another, and a high speed switching means in parallel with said capacitor which has a low resistance to current conduction in a first direction and a high resistance to current conduction in an opposite direction; said high speed switching means connected to opposite current flow therethrough from said capacitor when said capacitor is charged to said given potential and permitting current flow therethrough for potentials of a polarity opposite to the polarity of said given potential; said circuit means for connecting said capacitor and said first winding including a transformer; said transformer having a winding means connected to said capacitor and said first winding; and a D-C biasing means connected to said winding means to bias said transformer to saturation; the current polarity of the first half cycle discharge current of said capacitor through said winding means opposing the current polarity of said D-C biasing means.

2. The system of claim 1 wherein said high speed switching means is a rectifier device.

3. The system of claim 1 wherein said high speed switching means is a solid state diode.

4. The system of claim 1 wherein said high speed switching means includes an ignitron and means for firing said ignitron responsive to reversal of voltage across said capacitor.

5. The system of claim 1 wherein said high speed switching means includes a spark gap device and means for firing said spark gap device responsive to reversal of voltage across said capacitor.

References Cited
UNITED STATES PATENTS

| | | | |
|---|---|---|---|
| 2,525,872 | 10/1950 | Dawson | 307—108 |
| 3,041,501 | 6/1962 | Willits | 320—1 X |
| 3,128,361 | 4/1964 | Kesselring | 200—151 |
| 3,302,144 | 1/1967 | Jensen | 335—183 |
| 3,411,044 | 11/1968 | Langhein et al. | 317—151 X |

HERMAN O. JONES, Primary Examiner

T. R. JOIKE, Assistant Examiner

U.S. Cl. X.R.

317—151